United States Patent [19]

Thodos

[11] 3,841,022

[45] Oct. 15, 1974

[54] LAWN EDGING DEVICE
[75] Inventor: George Thodos, Evanston, Ill.
[73] Assignee: James E. Thomas, Oakbrook, Ill.
[22] Filed: Apr. 25, 1973
[21] Appl. No.: 354,373

[52] U.S. Cl............... 47/33, 52/732, 403/104, 403/363
[51] Int. Cl......... A01g 1/08, E04b 1/54, F16b 7/10
[58] Field of Search ........... 47/33; 52/11, 732, 716; 287/20.92 J, 189.36 C

[56] References Cited
UNITED STATES PATENTS
3,332,197   7/1967   Hinkle .............................. 52/732 X
3,373,668   3/1968   Moore et al. ...................... 47/33 X
3,724,128   4/1973   Tabone ................................ 47/33

FOREIGN PATENTS OR APPLICATIONS
1,281,280   12/1961   France ................................ 52/11
  399,250   10/1933   Great Britain ..................... 47/33
  694,036    9/1964   Canada .............................. 52/732

Primary Examiner—Robert E. Pulfrey
Assistant Examiner—Steven A. Bratlie

[57] ABSTRACT

A lawn edging device for defining the edges of flower beds, lawns, and the like, comprising a plurality of similar elongated members arranged and disposed for telescoping, interlocking interconnection to provide a continuous wall-like barrier.

7 Claims, 4 Drawing Figures

PATENTED OCT 15 1974 3,841,022

LAWN EDGING DEVICE

The invention relates to improved means of providing a wall-like barrier, a portion of which is disposed below the surface of the ground, for forming a boundary around a garden or flower bed to prevent the plant life of one area from invading another area.

It is a primary object of the invention to provide a device of the type described which is formed of similar sections which may be readily attached to each other without requiring any additional fastening aids or other securing means.

Another object of the invention is to provide a lawn edging device formed of sections which may be economically mass produced so as to be relatively inexpensive and yet which when interconnected, provide a rigid continuous barrier that is easy to assemble.

A more specific object of the invention is the provision, in a device of the type described, of self-joining members which are identical in contour, but which may be telescopically joined in snug interlocking relation to provide a continuous wall-like barrier.

These and other objects of the invention will be apparent from an examination of the following description and drawings, wherein.

It will be understood that, for purposes of clarity, certain elements may have been intentionally omitted from certain views where they are believed to be illustrated to better advantage in other views.

Figure 1:
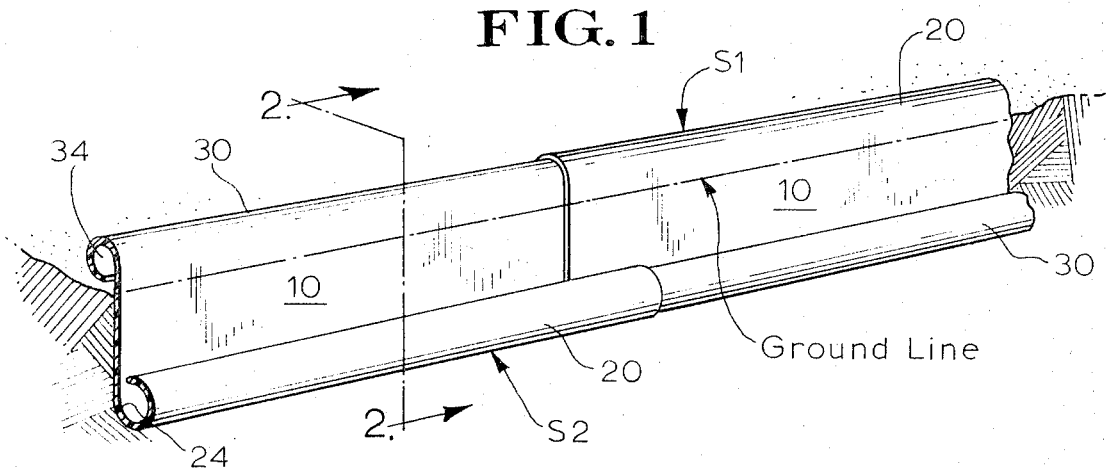
FIG. 1 is a perspective view of a lawn edging device embodying features of the invention.

Turning now to the drawings for a better understanding of the invention, and particularly to FIG. 1 of the invention, it will be seen that the lawn edging device of the invention is formed from a plurality of members indicated generally at S, which are interlockingly joined to one another at their ends.

Although all of the members S are identical in shape and size, because the positions of alternate members are inverted for connection to each other as explained in detail hereinafter, the right hand member illustrated in FIG. 1 is designated S1 and the left hand member is designated S2.

Figure 2:
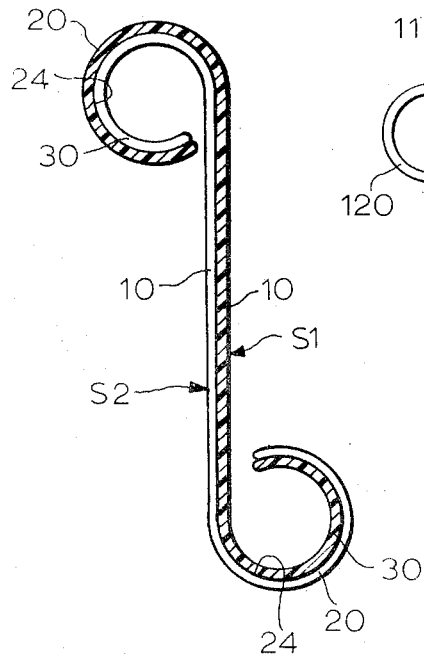
FIG. 2 is a vertical section taken on line 2—2 of FIG. 1.
Figure 3:
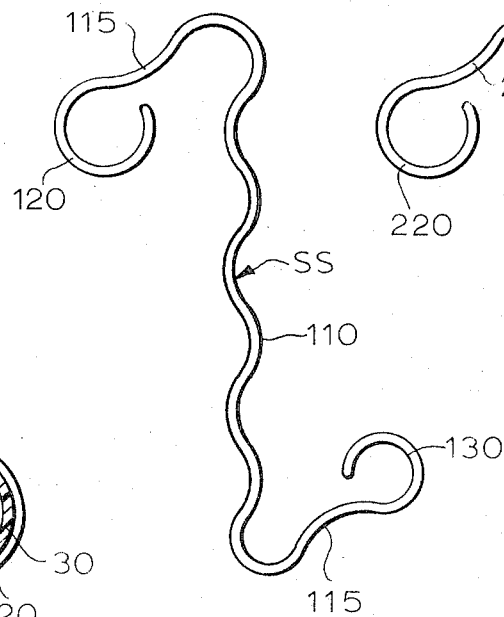
FIGS. 3 and 4 are end elevations of alternate forms of portions of the structure illustrated in the other views.
Figure 4:
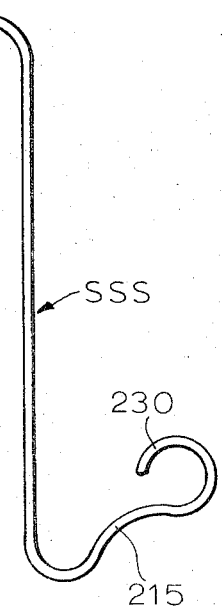

As best seen in FIG. 2, each member S includes a vertical central or body wall section 10, which may be flat as shown in the embodiments illustrated in FIGS. 2 and 4, or undulated as shown in the embodiment illustrated in FIG. 3. Formed integrally with and extending outwardly from the upper and lower edges of body wall section 10, on opposite sides thereof, are a pair of first and second hollow flange sections indicated generally at 20 and 30, respectively, which are of slightly different size.

Still referring to FIG. 2, it will be seen that the upper flange section of member S1 is the first section 20 and the lower flange section of member S1 is the second section 30. As the position of member S2 is inverted, the positions of its flange sections are reversed with its first flange section 20 on the bottom and its second flange section 30 on the top.

It will be seen that, with respect to each member S, the first flange section 20 is larger than the second flange section 30 and therefor presents an internal channel or bore 24 of sufficient size to telescopically receive a marginal portion of the second flange section of the adjacent member, while a marginal portion of the second flange section of the first member is received within the first flange section of the adjacent member, and at the same time, marginal portions of the body wall sections of the members are positioned in abutting face-to-face relation to provide a self-joining, snug telescoping connection therebetween which requires no external or additional fasteners or connecting means.

The snug fit is assured by the resilient character of the material from which each member is formed. In the preferred embodiment, the members are formed of a plastic material which can be extended to materially reduce the cost of production. Also, of course, plastic material will resist rust, corrosion and other deteriorating factors. It is possible of course to form members of a metallic material or other type of material available in sheet form without departing from the operation or principle of the present invention.

Turning now to FIG. 3 of the drawings it will be seen that a modified form of the invention is illustrated. In this embodiment the member SS is similar in principle and operation to the member S previously described except that the body wall section 110 is undulated rather than flat, and the first and second flange sections 120 and 130 are spaced further from the ends of the body wall section and connected thereto by an integral connecting strip or element 115. In this embodiment as in the previous embodiment, alternate members are inverted so that marginal portions of adjacent members can be telescopically received within one another for interlocking connection therebetween.

Turning now to FIG. 4, it will be seen that another modified form of the invention is illustrated. In this embodiment the structure of member SSS is similar to that of the structure of member SS with first and second flange sections 220 and 230 being similar in shape and arrangement to those of member SS, but with body wall section 210 being flat like the body wall section 10 of member S.

Thus, it will be understood that in each of the embodiments there is provided a novel and improved lawn edging device comprising a plurality of similar members arranged and disposed for easy telescoping attachment to each other, without requiring outside fastening means to provide a continuous wall-like barrier of simple design and construction.

I claim:

1. A lawn edging device for defining edges of lawns, gardens, flower beds, and the like consisting solely of a plurality of identically formed, elongated members, each of uniform cross-section throughout its entire length, having adjacent end portions interlockingly joined to each other, without additional connecting means, to provide a continuous barrier, a portion of which may be disposed below the surface of the ground with the remaining portion extending above the ground, each of said members being formed from a flexible, extractable material and comprising:

a. a generally vertical body wall section having at the upper and lower ends thereof, integral, first and second, hollow flange sections extending outwardly therefrom on opposite sides thereof;

b. each of said flange sections:

i. being generally cylindrical;
  ii. presenting an internal channel;
  iii. being relatively flexible;
c. the first flange section of each member being slightly larger than the second flange section to provide a self-contained, self-joined, interlocking connection in end-to-end relation with an adjacent similar member, the position of which has been inverted, so that a marginal portion of the second flange section of each member is snugly, telescopically received within a marginal portion of the first flange section of the other member and the body wall sections of the members are snugly positioned in abutting, face-to-face relation to provide a continuous wall like barrier.

2. A device according to claim 1, wherein said body wall section is relatively straight and flat.

3. A device according to claim 1, wherein said flange sections are located immediately adjacent to the related ends of said body wall section.

4. A device according to claim 1, wherein said body wall section has an undulated contour.

5. A device according to claim 1, wherein said flange sections are spaced from the related ends of the body wall section and are connected thereto by an integral connecting strip.

6. A device according to claim 1, wherein said members are formed of a resilient, flexible material.

7. A device according to claim 1, wherein said members are formed of a plastic material.

* * * * *